United States Patent
Tsubaki et al.

(10) Patent No.: US 12,300,445 B2
(45) Date of Patent: May 13, 2025

(54) ELECTROLYTIC CAPACITOR

(71) Applicant: Panasonic Intellectual Property Management Co., Ltd., Osaka (JP)

(72) Inventors: Yuichiro Tsubaki, Kyoto Fu (JP); Kazuyo Saito, Osaka Fu (JP); Tatsuji Aoyama, Kyoto Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 239 days.

(21) Appl. No.: 18/246,089

(22) PCT Filed: Sep. 24, 2021

(86) PCT No.: PCT/JP2021/035092
§ 371 (c)(1),
(2) Date: Mar. 21, 2023

(87) PCT Pub. No.: WO2022/065434
PCT Pub. Date: Mar. 31, 2022

(65) Prior Publication Data
US 2023/0368982 A1    Nov. 16, 2023

(30) Foreign Application Priority Data
Sep. 25, 2020    (JP) .................... 2020-161360

(51) Int. Cl.
*H01G 9/035*    (2006.01)
*H01G 9/145*    (2006.01)

(52) U.S. Cl.
CPC ............. *H01G 9/035* (2013.01); *H01G 9/145* (2013.01)

(58) Field of Classification Search
CPC .................... H01G 9/035; H01G 9/145
See application file for complete search history.

(56) References Cited

U.S. PATENT DOCUMENTS

2017/0372842 A1* 12/2017 Lazarev ............... H01G 9/15
2018/0047521 A1    2/2018 Tsuda
(Continued)

FOREIGN PATENT DOCUMENTS

CN    108475740 A  *  8/2018  ............ C08K 3/00
JP    2004-186580 A    7/2004
(Continued)

OTHER PUBLICATIONS

International Search Report dated Nov. 2, 2021 issued in International Patent Application No. PCT/JP2021/035092, with English translation.

*Primary Examiner* — Michael P McFadden
(74) *Attorney, Agent, or Firm* — Rimon P.C.

(57) ABSTRACT

An electrolytic capacitor includes a capacitor element and a liquid component, wherein the capacitor element includes an anode body having a dielectric layer on a surface thereof, and a conductive polymer compound covering at least a portion of the dielectric layer. The liquid component includes an acid component, a base component, a solvent, and an antioxidant. The solvent includes water and a polyol compound. The acid component includes a coordination compound including a central atom, and an organic molecule having a plurality of coordination atoms bonded to the central atom, and at least one of the plurality of coordination atoms is an oxygen atom bonded to a carbonyl group.

11 Claims, 2 Drawing Sheets

(56) References Cited

U.S. PATENT DOCUMENTS

| | | | |
|---|---|---|---|
| 2018/0233292 A1 | 8/2018 | Tsubaki et al. | |
| 2020/0211785 A1 | 7/2020 | Tsubaki et al. | |
| 2021/0343482 A1 | 11/2021 | Tsubaki et al. | |

FOREIGN PATENT DOCUMENTS

| | | | | |
|---|---|---|---|---|
| JP | 2006-114540 A | | 4/2006 | |
| JP | 2007246840 A | * | 9/2007 | |
| JP | 2020-107791 A | | 7/2020 | |
| WO | 2016/174807 A1 | | 11/2016 | |
| WO | 2017/073062 A1 | | 5/2017 | |
| WO | WO-2019146564 A1 | * | 8/2019 | ............ G01N 21/78 |
| WO | 2020/022471 A1 | | 1/2020 | |

* cited by examiner

ELECTROLYTIC CAPACITOR

CROSS-REFERENCE OF RELATED APPLICATIONS

This application is the U.S. National Phase under 35 U.S.C. § 371 of International Patent Application No. PCT/JP2021/035092, filed on Sep. 24, 2021, which in turn claims the benefit of Japanese Patent Application No. 2020-161360, filed on Sep. 25, 2020, the entire disclosures of which Applications are incorporated by reference herein.

TECHNICAL FIELD

The present invention relates to an electrolytic capacitor including a conductive polymer compound and a liquid component.

BACKGROUND ART

The electrolytic capacitor includes a capacitor element, and a liquid component (liquid electrolyte). The capacitor element includes an anode body having a dielectric layer on a surface, and a conductive polymer compound covering at least a portion of the dielectric layer. The liquid component includes an acid component, a base component, and a solvent. Various examinations have been conducted on the liquid component.

Patent Literature 1 has proposed using a composite acid compound of an organic acid and an inorganic acid such as borodisalicylic acid for the acid component of the liquid component. By using the composite acid compound, deterioration of the acid component by heat can be suppressed. Patent Literature 2 has proposed including an antioxidant such as phenol in the liquid electrolyte. The antioxidant is used for a purpose of suppressing deterioration by oxidation of a conductive polymer compound.

CITATION LIST

Patent Literature

PLT1: WO 2020/022471
PLT2: Japanese Laid-Open Patent Publication No. 2006-114540

SUMMARY OF INVENTION

Solution to Problem

When the liquid component contains water, oxygen is supplied to the anode body, and functions by the liquid component to repair defects in the dielectric layer are brought out easily. However, when the liquid component contains a composite acid compound along with water, the water included in the liquid component causes the composite acid compound to go through hydrolysis, and acid (e.g., salicylic acid) generated from decomposition may affect and cause erosion of the anode body, which may increase an equivalent series resistance (ESR). Also, the erosion of the anode body affects and causes insufficient repair of the dielectric layer defects, which may increase a leak current.

Means for Solving the Problem

An aspect of the present disclosure relates to an electrolytic capacitor including: a capacitor element and a liquid component, wherein the capacitor element includes an anode body having a dielectric layer on a surface thereof, and a conductive polymer compound covering at least a portion of the dielectric layer, the liquid component includes an acid component, a base component, a solvent, and an antioxidant, the solvent includes water and a polyol compound, the acid component includes a coordination compound, and an organic molecule having a plurality of coordination atoms bonded to the central atom, and at least one of the plurality of coordination atoms is an oxygen atom bonded to a carbonyl group.

Effects of Invention

With the present invention, the increase in the ESR and leak current of the electrolytic capacitor can be suppressed. While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
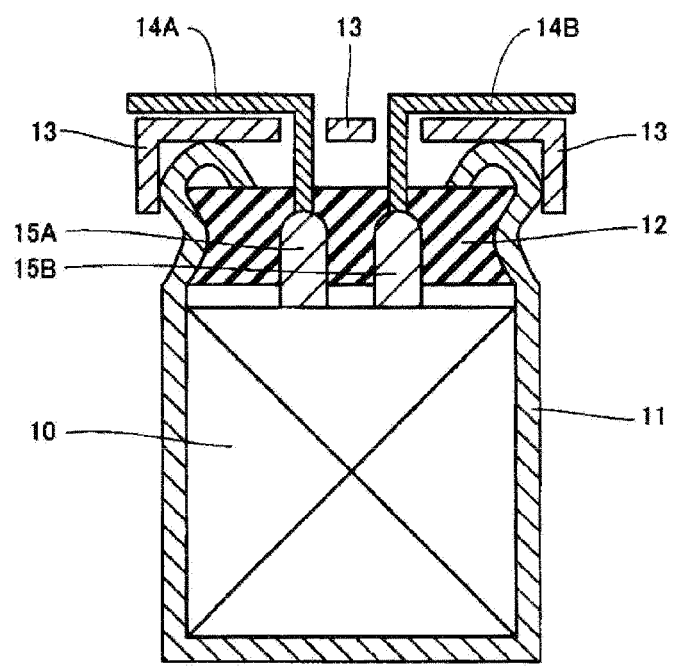
FIG. 1 is a schematic cross sectional view of an electrolytic capacitor in an embodiment of the present invention.

The electrolytic capacitor in an embodiment of the present invention includes a capacitor element and a liquid component. The capacitor element includes an anode body having a dielectric layer on a surface thereof, and a conductive polymer compound covering at least a portion of the dielectric layer. The liquid component includes an acid component, a base component, a solvent, and an antioxidant. The solvent includes water and a polyol compound. The acid component includes a coordination compound. The coordination compound includes a central atom, and an organic molecule having a plurality of coordination atoms bonded to the central atom. At least one of the plurality of coordination atoms is an oxygen atom bonded to a carbonyl group.

In the coordination compound, the central atom is strongly bonded to the coordination atom, and it has excellent thermal stability, and therefore the liquid component including the coordination compound is advantageous in improvement in heat resistance of an electrolytic capacitor. Also, when the liquid component includes water, oxygen is supplied to the anode body, and repair functions for the dielectric layer improve. For example, when the anode body includes aluminum, oxygen supplied to the anode body may contribute to production of aluminum oxide at defect portions of the dielectric layer.

On the other hand, the coordination compound includes an organic molecule having an oxygen atom bonded to a carbonyl group as the coordination atom, and goes through hydrolysis by water included in the liquid component, and may generate acid having a carboxy group, or a carboxy group and a hydroxy group. These decomposed acids cause the anode body to undergo erosion, and impurities (e.g., chelate of aluminum) are generated on the anode body surface therealong, and an interface resistance between the anode body and the conductive polymer compound increases, which may increase ESR. The effect from the impurity may cause insufficient repair of the dielectric layer defects, and may increase the leak current.

In contrast, the present invention includes an antioxidant and a polyol compound in the liquid component including water and a coordination compound. In this manner, erosion of the anode body from the above-described decomposed acid is suppressed, and an increase in ESR and leak current involved with the anode body erosion is suppressed. In particular, the effects of suppressing increase in ESR and leak current can be achieved significantly for use under high temperature and long-term use.

When the antioxidant and polyol compound are used in combination with the liquid component including water and coordination compound, the effect of suppressing increase in ESR and the like can be significantly achieved. The reasons are unclear but can be assumed to be as follows. COOH (carboxy group) of the decomposed acid is formed into CHO (converted into aldehyde group) from effects of the antioxidant. The decomposed acid having a carboxy group reacts with a polyol compound having a hydroxy group to go through esterification. It is assumed that the CHO formation of the decomposed acid and effects of esterification together achieves the above-described significant effects.

In the following, the liquid component is described in detail.

(Liquid Component)

The liquid component makes contact with the dielectric layer directly or through the conductive polymer compound. The liquid component may be present between the dielectric layer of the anode body and the cathode body, along with the conductive polymer compound. In the liquid component, the acid component and the base component can be present as an anion and a cation, respectively. Thus, the liquid component can function as a highly conductive liquid electrolyte. The liquid component increases contacts between the dielectric layer and the conductive polymer compound, and has a function to repair dielectric layer defects.

(First Acid Component)

The acid component includes a coordination compound as a first acid component. The ratio of the coordination compound in the liquid component may be, for example, 0.5 mass % or more, and may be 3 mass % or more, 0.5 mass % or more and 30 mass % or less, 3 mass % or more and 30 mass % or less.

The coordination compound includes a central atom and an organic molecule. The organic molecule has a plurality of coordination atoms bonded to the central atom. Preferably, because it can form a strong bond with the coordination atom, the central atom of the coordination compound includes at least one selected from the group consisting of a boron atom, an aluminum atom, and a silicon atom. The organic molecule may form a complex anion along with the central atom. At this time, the organic molecule may be present as, for example, an organic group in which the proton bonded to the coordination atom is deprotonated. The number of the molecules of organic molecules coordinated per one central atom may be 1 molecule, or 2 molecules or more. In view of stability of the complex anion, an organic molecule in which organic molecules of 2 or more molecules (e.g., 2 molecules or 3 molecules) per two central atoms are coordinated may be selected.

The quantitative and qualitative analysis of the complex anion can be performed by, for example, the following method.

<Qualitative Analysis>

First, 30 mL of a liquid component is weighed in a glass made vessel having an airtight lid, and the infrared absorption spectrum (IR) of the liquid component in the vessel is measured with a predetermined measurement device (IR-Sprit [manufactured by SHIMADZU CORPORATION]). Then, the vessel accommodating the liquid component is sealed and kept for a predetermined time under a high temperature environment. Afterwards, the liquid component in the vessel is allowed to stand to cool, and then IR is measured again. Stability of the complex anion can be evaluated based on changes in the stretching vibration spectrum of the bond between the central atom-coordination atom. Smaller changes in the spectrum show higher stability of complex anions.

<Quantitative Analysis>

First, 30 mL of the liquid component is weighed in a glass made vessel having a sealed lid, and nuclear magnetic resonance spectrum (NMR) of the liquid component in the vessel is measured with a predetermined measurement device ([AVANCE III HD [manufactured by BRUKER]), to determine the initial generation ratio of the complex anion (G0) from the peak intensity. Next, the vessel accommodating the liquid component is sealed and kept for a predetermined time under a high temperature environment. Afterwards, the liquid component in the vessel is allowed to stand to cool, and the NMR is measured again to determine the generation ratio (G1) of the complex anion to unreacted organic molecule. The decomposition rate of the complex anion is determined based on the formula below, and stability of the complex anion can be evaluated. A smaller decomposition rate means a higher stability of the complex anion.

generation ratio $G1(\%)$ of complex anion=(peak intensity of complex anion)/(peak intensity of complex anion+peak intensity of unreacted organic molecule)×100 decomposition rate (%) of complex anion=initial generation ratio $G0(\%)$ of complex anion−generation ratio $G1(\%)$ of complex anion At least one of the plurality of coordination atoms included in the coordination compound is an oxygen atom bonded to a carbonyl group. The plurality of coordination atoms may include a plurality of oxygen atoms, or all of the plurality of coordination atoms may be oxygen atoms. The plurality of coordination atoms may include at least an oxygen atom bonded to a carbonyl group, and may further include an oxygen atom bonded to a carbon atom not having an oxo group (=O).

When the coordination atom is an oxygen atom bonded to a carbonyl group, hydrolysis may generate an organic compound having an organic molecule derived carboxy group. When the coordination atom is an oxygen atom bonded to a carbon atom not having an oxo group (=O), hydrolysis may generate an organic compound having an organic molecule derived hydroxy group.

Preferably, the organic molecule includes at least one selected from the group consisting of hydroxy acid and polycarboxylic acid. Examples of the hydroxy acid include aliphatic hydroxy acid (glycol acid, lactic acid, tartronic acid, α-, β- or γ-hydroxy butyric acid, malic acid, citric acid, etc.), and aromatic hydroxy acid (salicylic acid, mandelic acid, benzyl acid, etc.). Examples of the polycarboxylic acid include aliphatic polycarboxylic acid (oxalic acid, malonic acid, succinic acid, adipic acid, maleic acid, etc.), and aromatic polycarboxylic acid (phthalic acid, etc.). When the organic molecule is hydroxy acid, in the coordination compound, the central atom is bonded to at least two oxygen atoms, and one oxygen atom is bonded to the carbonyl group, and the other oxygen atom is bonded to the carbon atom not having the oxo group.

The plurality of coordination atoms included in the coordination compound may include an oxygen atom bonded to a carbonyl group, and a nitrogen atom. The number of oxygen atoms and nitrogen atoms may be one, or a plural number. When the oxygen atom is a plural number, at least one of the plurality of oxygen atoms may be bonded to the carbonyl group. In this case, an oxygen atom bonded to a carbon atom not having an oxo group may be further included. Examples of the organic molecule including above-described oxygen atom and nitrogen atom as a coordination atom include amino carboxylic acid chelating agent and the like. Examples of the amino carboxylic acid chelating agent include ethylenediamine tetraacetic acid, nitrilotriacetic acid, diethylene triamine pentaacetic acid, hydroxyethyl ethylene diamine triacetic acid, hydroxyethyl imino diacetic acid, L-aspartic acid-N,N-diacetic acid, and hydroxy imino disuccinic acid.

When the central atom is boron or aluminum, for example, a complex anion with a coordination number of four may be formed. Typically, it may be a complex anion in which two organic molecules (e.g., hydroxy acid, dicarboxylic acid) are coordinated to a boron atom or aluminum atom. When the central atom is silicon, for example, a complex anion with a coordination number of five or six may be formed. Typically, it may be a complex anion in which three organic molecules are coordinated to a silicon atom.

Preferably, in view of excellent thermal stability, the coordination compound includes at least one selected from the group consisting of borodisalicylic acid, borodiglycollic acid, and borodioxalic acid.

(Second Acid Component)

The acid component may include, as a second acid component, an oxoacid other than the first acid component. The oxoacid of the second acid component does not include an organic carboxylic acid. When an organic carboxylic acid (organic molecule having a carboxy group) and an oxoacid other than organic carboxylic acid are produced by hydrolysis of the coordination compound, by including a second acid component in the liquid component along with the coordination compound, hydrolysis reaction of the coordination compound, which is an equilibrium reaction, is suppressed, and production of the organic carboxylic acid that causes the anode body erosion is suppressed. Preferably, in view of easily controlling hydrolysis reaction (equilibrium reaction) of the coordination compound, the second acid component is the same as the oxoacid other than the organic carboxylic acid produced by the hydrolysis of the coordination compound.

The second acid component may be an inorganic acid. Examples of the inorganic acid include boric acid, phosphoric acid, phosphorous acid, hypophosphorous acid, and sulfuric acid. Preferably, in particular, the second acid component is boric acid. Hydrolysis of the coordination compound formed by an organic carboxylic acid such as salicylic acid and boric acid is easily suppressed, and erosion of anode body by decomposed acid is easily suppressed. The above-described coordination compound with excellent thermal stability is present without decomposition, and deterioration of the acid component by the heat is easily suppressed.

The molar ratio of the oxoacid (second acid component) other than the coordination compound relative to the organic molecule:oxoacid/organic molecule is preferably 0.05 or more and 30 or less, more preferably 0.5 or more and 30 or less. In this case, the pH of the liquid component is kept suitably, and hydrolysis of the coordination compound is effectively suppressed easily.

(Base Component)

Examples of the base component include an amine compound. The amine compound is advantageous in keeping a low ESR when using the electrolytic capacitor for a long time. For the amine compound, aliphatic amine, aromatic amine, heterocyclic amine, and the like can be used. Preferably, in particular, aliphatic amine with a molecular weight of 72 or more and 102 or less is used in terms of a high dissociation.

The amine compound may include at least one selected from the group consisting of a primary amine compound, secondary amine compound, and tertiary amine compound. In this case, thermal stability of the liquid component is increased, and heat resistance of the electrolytic capacitor is improved. Examples of the first to tertiary amine compounds include methyl amine, dimethyl amine, monoethyl dimethyl amine, trimethyl amine, ethyl amine, diethyl amine, triethyl amine, ethylene diamine, N,N-diisopropyl ethyl amine, tetra methyl ethylene diamine, hexamethylene diamine, spermidine, spermine, amantadine, aniline, phenethylamine, toluidine, pyrrolidine, piperidine, piperazine, morpholine, imidazoline, imidazoline, pyridine, pyridazine, pyrimidine, pyrazine, and 4-dimethyl amino pyridine. A kind of amine compound may be used singly, or two or more kinds thereof may be used in combination. Preferably, in particular, tertiary amines such as triethyl amine, monoethyl dimethyl amine, and the like are used.

Preferably, the liquid component includes more of the acid component than the base component. The acid component causes to lower the pH of the liquid electrolyte from the initial period, and suppresses dedoping of a dopant from the conductive polymer. By including more of the acid component than the base component, dedoping (deterioration of solid electrolyte) of a dopant from the conductive polymer can be suppressed. Preferably, the acid component includes more of the acid component than the base component, because it contributes to functions of the liquid component to repair the dielectric layer.

In view of suppressing dedoping of a dopant from the conductive polymer, the molar ratio of the acid component relative to the base component: (acid component/base component) is, for example, 1 or more, may be 1.1 or more, preferably 1.5 or more, more preferably 1.5 or more and 10.0 or less.

In view of suppressing dedoping of a dopant from the conductive polymer, the liquid component may have a pH of 4.0 or less, or 0.1 or more and 3.5 or less.

In the liquid component, a total of the acid component content and base component content may be, relative to the liquid component as a whole, for example, 3 mass % or more and 30 mass % or less, 5 mass % or more and 25 mass % or less. With the above-described range, the repairing characteristics of the dielectric layer improve, and a liquid component with excellent conductivity can be easily obtained.

(Solvent)

The solvent includes at least water and a polyol compound. The water included in the liquid component may be derived from water included in the dispersion liquid of the conductive polymer compound used in a process of covering the dielectric layer surface with a film of the conductive polymer compound. It may be derived also from a water content derived from members of a separator or a metal foil and the like, or included in the polyol compound.

The water content relative to the liquid component as a whole may be 0.1 mass % or more and 30 mass % or less, 0.1 mass % or more and 15 mass % or less, or 0.1 mass % or more and 10 mass % or less. The water content relative to the liquid component as a whole may be 1 mass % or more, 15 mass % or less, or 1 mass % or more and 10 mass % or less.

When the water content is 0.1 mass % or more, functions of the liquid component to repair the dielectric layer are easily brought out. When the water content is 1 mass % or more, the repairing characteristics of the liquid component for the dielectric layer further improve. When the water content is 15 mass % or less, the liquid component includes the antioxidant, and therefore oxidation deterioration of the conductive polymer compound is easily suppressed, and increase in ESR by the deterioration of the conductive polymer compound is easily suppressed. When the water content is 10 mass % or less, the above-described oxidation deterioration of the conductive polymer compound is further suppressed.

The water content relative to the liquid component as a whole may be 0.1 mass % or more and 5 mass % or less, 0.5 mass % or more and 5 mass % or less, or 1 mass % or more and 5 mass % or less. When the above-described water content is 5 mass % or less, the increase in the internal pressure of the electrolytic capacitor at the time of reflow processing and deformation of the sealing portion therealong is easily suppressed.

The water content relative to the liquid component as a whole may be 5 mass % or more and 10 mass % or less. When the above-described water content is 5 mass % or more, a large amount of decomposed acid is generated due to hydrolysis of the coordination compound, but by using the antioxidant and polyol compound, the effects of suppressing erosion of the anode body based on decomposed acid are significantly achieved.

The water content in the liquid component is determined by decomposing the electrolytic capacitor, taking out a liquid component sample, and measuring the water content in the sample using a Karl Fischer titrator.

The polyol compound easily dissolves the coordination compound, and easily esterify the decomposed acid of the coordination compound. The ratio of the polyol compound in the solvent may be, for example, 5 mass % or more, or may be 50 mass % or more. The solvent other than water may be entirely the polyol compound. A kind of polyol compound may be used singly, or two or more kinds thereof may be used in combination. For analysis on the polyol compound, gas chromatography mass spectrometry (GC/MS) and the like can be used.

Preferably, the polyol compound includes a glycerine compound. Using the glycerine compound swells the conductive polymer compound, and improves orientation of the conductive polymer compound. In this manner, electrical conductivity of the conductive polymer compound improves, and ESR is easily reduced. The glycerine compound has a high boiling point, and permeation from the sealing portion of the electrolytic capacitor to outside is suppressed. Thus, reduction of the solvent in the liquid component due to exposure of the electrolytic capacitor to a high temperature and the like is suppressed, repairing characteristics of the dielectric layer improve, and the withstand voltage improves. Furthermore, the decomposed acid having a carboxy group easily esterify with the glycerine compound compared with a phenol antioxidant having a hydroxy group bonded to an aromatic ring. When the solvent includes a glycerine compound, the effect of decomposed acid having a carboxy group to esterify the phenol antioxidant is reduced, and the functions of the phenol antioxidant to CHO formation from the decomposed acid and functions of suppressing oxidation deterioration of the conductive polymer compound are easily brought out.

The glycerine compound includes glycerine, polyglycerine, and derivatives thereof. Examples of the derivative of glycerine or polyglycerine include esters in which at least a portion of a hydroxy group of glycerine or polyglycerine is esterified, and alkylene oxide adduct of glycerine or polyglycerine. Examples of the polyglycerine include diglycerol and triglycerine.

The polyglycerine includes a structure of repeating glycerine units. The repeating number of the glycerine unit included in the polyglycerine may be, for example, 2 or more and 15 or less, 2 or more and 12 or less, 2 or more and 10 or less, or 2 or more and 6 or less. Preferably, polyglycerine has a weight-average molecular weight of, for example, 200 or more and 1000 or less, more preferably 300 or more and 800 or less.

Preferably, the polyol compound includes a glycol compound. Using a glycol compound (e.g., alkylene glycol such as ethylene glycol), the conductive polymer compound swells and orientation of the conductive polymer compound improves. In this manner, electrical conductivity of the conductive polymer compound improves, and ESR is easily reduced. Furthermore, the glycol compound does not easily evaporate, decrease in the solvent in the liquid component due to exposure of the electrolytic capacitor to a high temperature is suppressed, repairing characteristics for the dielectric layer improve, and the withstand voltage improves.

The glycol compound includes alkylene glycol and polyalkyleneglycol. The polyalkyleneglycol may be a homopolymer, or a copolymer (e.g., copolymer including ethylene oxide (EO) unit and propylene oxide (PO) unit etc.). The weight-average molecular weight of polyalkyleneglycol may be, for example, 100 or more and 3000 or less, or 100 or more and 2000 or less. The weight-average molecular weight of polyethylene glycol may be, for example, 100 or more and 600 or less, or 100 or more and 400 or less. Specific examples of the glycol compound include ethylene glycol, propylene glycol, butylene glycol, hexylene glycol, diethylene glycol, and triethylene glycol, and in particular, ethylene glycol is preferable. Ethylene glycol has a low viscosity among glycol compounds, and easily dissolves the acid component including the coordination compound and base component. Furthermore, ethylene glycol has a high thermal conductivity, and excellent heat-releasing characteristics, and therefore is advantageous in improvement in heat resistance of electrolytic capacitors.

The solvent may include a component other than the polyol compound and water. Examples of such a component include a sulfone compound, sulfoxide compound, lactone compound, and carbonate compound.

Examples of the sulfone compound include dimethyl sulfone, diethyl sulfone, sulfolane, and 3-methyl sulfolane. Examples of the sulfoxide compound include dimethyl sulfoxide, and diethyl sulfoxide. Examples of the lactone compound include γ-butyrolactone and γ-valerolactone. Examples of the carbonate compound include dimethyl carbonate, diethyl carbonate, ethyl methyl carbonate, ethylene carbonate, propylene carbonate, and fluoro ethylene carbonate. A kind of the component other than the polyol compound may be used singly, or two or more kinds thereof may be used in combination.

In view of dissociation of the acid component and base component, ion conductivity, and heat resistance, the other component other than the organic compound having a hydroxy group is preferably γ-butyrolactone and sulfolane.
(Antioxidant)

The antioxidant may include at least one selected from the group consisting of a phenol antioxidant, amine antioxidant, phosphorus antioxidant, sulfur antioxidant, and aliphatic antioxidant. In particular, in view of reactivity with oxygen, preferably, the phenol antioxidant is used.

Preferably, the phenol antioxidant includes at least one selected from the group consisting of a monophenol antioxidant, bisphenol antioxidant, and polyphenol antioxidant. In particular, in view of a large amount of a functional group with excellent reactivity with oxygen, polyphenol is preferable.

The monophenol antioxidant preferably includes 2,6-di-tert-butyl-4-methyl phenol, butyl hydroxy anisole, sesamol, tocopherol, tocotrienol, and p-nitro phenol. The monophenol antioxidant may include mono, di, or tri (α-methyl benzyl) phenol, trolox, normelatonin, and ferulic acid.

The bisphenol antioxidant preferably includes anoxomer. The bisphenol antioxidant may include 2,2'-methylene bis (4-ethyl-6-tert-butyl phenol), 2,2'-methylene bis(4-methyl-6-tert-butyl phenol), 4,4'-butylidene bis(3-ethyl-6-tert-butyl phenol), 4,4'-thio bis(3-ethyl-6-tert-butyl phenol), and a butyl formation reaction product of p-cresol and dicyclopentadiene.

The polyphenol antioxidant preferably includes 2,5-di-tert-butyl hydroquinone, 2,5-di-tert-amyl hydroquinone, gallic acid, propyl gallate, chlorogenic acid, catechin, epigallocatechin, epigallocatechin gallate, rosmarinic acid, genkwanin, luteolin, carnosic acid, carnosol, ursolic acid, pyrogallol, chebulagic acid, hydroxy tyrosol, dopamine, caffeic acid, adrenaline, noradrenaline, catechol, urushiol, hydroquinone, and resorcinol.

The polyphenol antioxidant may include protocatechuic acid, rutin, gnetinC, theaflavin, luteolin, resveratrol, pinocembrin, pinobanksin, 1,3,5-tris (3,5-di-tert-butyl-4-hydroxy benzyl)-1,3,5-triazine-2,4,6(1H,3H,5H)-trione, and 4,4',4''-(1-methyl propanil-3-ylidene) tris (6-tert-butyl-m-cresol).

The amine antioxidant includes an aromatic secondary amine antioxidant, benzotriazole antioxidant, benziimidazole antioxidant, and amine-ketone antioxidant.

The aromatic secondary amine antioxidant includes N-phenyl-1-naphthyl amine, diphenyl amine antioxidant, and phenylene diamine antioxidant. The diphenyl amine antioxidant includes alkylated diphenyl amine such as p,p'-dioctyl diphenyl amine, 4,4'-bis(α,α-dimethyl benzyl) diphenyl amine, and p-(p-toluene sulfonyl amide) diphenyl amine. The phenylene diamine antioxidant includes N,N'-di-2-naphthyl-p-phenylene diamine, N-phenyl-N'-isopropyl-p-phenylene diamine, N-phenyl-N'-(1,3-dimethyl butyl)-p-phenylene diamine, and N-phenyl-N'-(3-methacryloyl oxy-2-hydroxy propyl)-p-phenylene diamine.

The benzotriazole antioxidant includes benzotriazole. The benziimidazole antioxidant includes benziimidazole, 2-mercapto benziimidazole, 2-mercapto methyl benziimidazole, and imidazole dipeptide. The amine-ketone antioxidant includes 2,2,4-tri methyl-1,2-dihydroquinoline polymer, 6-ethoxy-1,2-dihydro-2,2,4-trimethylquinoline, reactant of diphenyl amine and acetone, acetylcysteine, and melatonin.

The phosphorus antioxidant includes a phosphoric acid ester antioxidant and phosphite antioxidant. Examples of the ester include monoalkyl ester, dialkyl ester, and trialkyl ester. Examples of the phosphite antioxidant include tris (nonyl phenyl) phosphite.

The sulfur antioxidant includes thioether antioxidant, isothio cyanate, sulfurous acid (salt), and pyrosulfurous acid (salt). The thioether antioxidant includes phenothiazine, dibenzyl disulfide, diacetyl sulfide, and dilauryl thiodipropionate.

The aliphatic antioxidant includes citric acid, L-ascorbic acid, erythorbic acid, and ethylenediamine tetraacetic acid.

A kind of antioxidant may be used singly, or two or more kinds thereof may be used in combination. In the liquid component, the antioxidant content is, for example, relative to the liquid component as a whole, 0.5 mass % or more and 30 mass % or less. For analysis on the antioxidant, liquid chromatography (LC), gas chromatography mass spectrometry (GC/MS), and the like are used.

In the liquid component, the molar ratio of the antioxidant relative to the organic molecule in the coordination compound: antioxidant/organic molecule may be 0.05 or more and 30 or less, or 0.5 or more and 30 or less. In this case, the antioxidant easily and effectively forms CHO from the decomposed acid derived from organic molecules.
(Capacitor Element)

The capacitor element includes at least an anode body having a dielectric layer on a surface thereof, and a conductive polymer compound covering at least a portion of the dielectric layer. In the following, the capacitor element is described in detail.
(Anode Body)

The anode body may include a valve metal, an alloy including a valve metal, and a compound including a valve metal. These materials may be used singly, or may be used in combination of two or more. Preferable examples of the valve metal include aluminum, tantalum, niobium, and titanium. The anode body having a porous surface may be obtained by, for example, roughening the surface of the substrate (foil or plate substrate etc.) including a valve metal by etching and the like. The anode body may be a molded product of particles including the valve metal or a sintered product thereof. The sintered product has a porous structure.
(Dielectric Layer)

The dielectric layer is formed by anodizing the valve metal at the anode body surface by chemical formation and the like. The dielectric layer may be formed so as to cover at least a portion of the anode body. The dielectric layer is formed generally on the anode body surface. The dielectric layer is formed on the surface of the pores of the anode body, and therefore formed along the inner wall surface of the pores or depressions (pits) of the anode body surface.

The dielectric layer includes an oxide of the valve metal. For example, the dielectric layer when tantalum is used as the valve metal includes $Ta_2O_5$, and the dielectric layer when aluminum is used as the valve metal includes $Al_2O_3$. The dielectric layer is not limited to these, and may be any dielectric layer that functions as a dielectric. When the anode body surface is porous, the dielectric layer is formed along the anode body surface (including inner wall surface of the pores).
(Conductive Polymer Compound)

Examples of the conductive polymer compound include a πconjugated polymer compound. Examples of the conductive polymer compound include polypyrrole, polythiophene, polyfuran, polyaniline, polyacetylene, polyphenylene, polyphenylene vinylene, polyacene, and polythiophene vinylene. These may be used singly, or two or more of them may be used in combination, or may be a copolymer of two or more monomers. The conductive polymer compound has a weight-average molecular weight of, for example, 1000 to 100000.

In this specification, polypyrrole, polythiophene, polyfuran, and polyaniline means a polymer with a basic skeleton of polypyrrole, polythiophene, polyfuran, and polyaniline, respectively. Thus, polypyrrole, polythiophene, polyfuran, and polyaniline also include derivatives thereof. For example, polythiophene includes poly(3,4-ethylene dioxythiophene).

The conductive polymer compound may be doped with a dopant. The dopant may be polyanion. Specific examples of the polyanion include polyvinyl sulfonic acid, polystyrene sulfonic acid, polyaryl sulfonic acid, polyacryl sulfonic acid, polymethacryl sulfonic acid, poly(2-acrylamide-2-methyl propane sulfonic acid), polyisoprene sulfonic acid, and polyacrylic acid. These may be used singly, or two or more may be used in combination. These may be a polymer of a single monomer, or may be a copolymer of two or more monomers. Preferably, a polystyrene sulfonic acid derived polyanion is used.

At least a portion of the dielectric layer surface is covered with a conductive polymer layer (solid electrolyte layer). The conductive polymer layer may include a dopant along with the conductive polymer compound. In the electrolytic capacitor, the conductive polymer layer may form a portion of the cathode portion along with the cathode body. The conductive polymer layer may further include, as necessary, an additive.

The conductive polymer layer may be formed, for example, by chemical polymerization and/or electropolymerization of a raw material monomer on the dielectric layer. Alternatively, by allowing the solution in which the conductive polymer compound is dissolved, or a dispersion liquid in which the conductive polymer compound is dispersed to make contact with the dielectric layer, it can be formed. The conductive polymer layer may be formed so as to cover at least a portion of the dielectric layer.

(Cathode Body)

By including the polyol compound and antioxidant in the liquid component including the coordination compound and water, CHO formation from the decomposed acid based on hydrolysis of the coordination compound and esterification progress, and erosion of the cathode body by the decomposed acid is suppressed. When erosion of the cathode body progresses and impurities are formed on the cathode body surface, the interface resistance of the cathode body and conductive polymer compound increases, and the ESR increases.

For the cathode body, metal foil may be used. The type of the metal is not particularly limited, but preferably, valve metals such as aluminum, tantalum, niobium, and the like or an alloy including the valve metal may be used. As necessary, the metal foil surface may be roughened. The metal foil surface may be provided with an anodizing film, or may be provided with a coating of a metal (different metal) that is different from the metal forming the metal foil or a nonmetal. Examples of the different metal or nonmetal include, for example, metal such as titanium and nonmetal such as carbon.

(Separator)

When the metal foil is used as the cathode body, a separator may be provided between the metal foil and anode body. Examples of the separator include, without particular limitation, a nonwoven fabric including fibers of cellulose, polyethylene terephthalate, vinylon, and polyamide (e.g., aliphatic polyamide, aromatic polyamide such as aramid and the like).

(Others)

The electrolytic capacitor with at least one capacitor element will suffice, and it may have a plurality of capacitor elements. The number of the capacitor element included in the electrolytic capacitor may be determined in accordance with its applications.

In the following description, embodiments of the present invention will be described in detail. The present invention, however, is not limited to the following embodiments.

Figure 2:
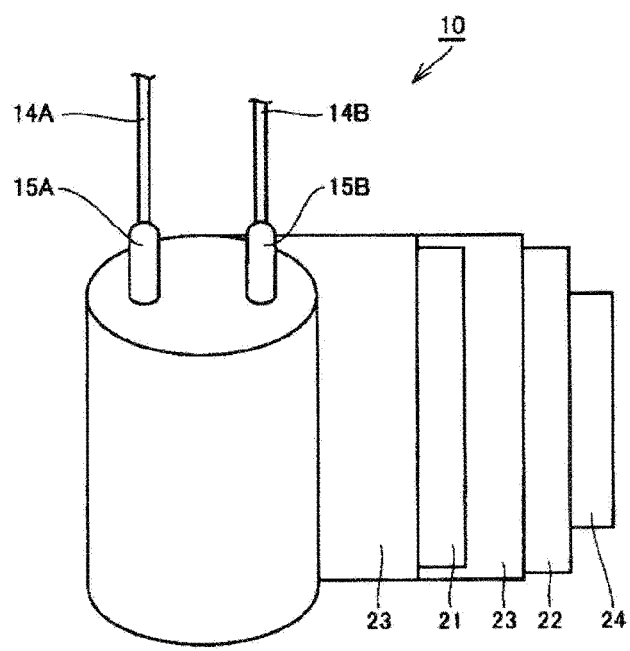
FIG. 2 is a schematic view for illustrating a configuration of the capacitor element in the same embodiment.

FIG. 1 is a schematic cross sectional view of an electrolytic capacitor of this embodiment, and FIG. 2 is a schematic view of the same electrolytic capacitor, in which a part of the capacitor element is exploded.

As shown in FIG. 1, the electrolytic capacitor includes a capacitor element 10, a liquid component (not shown), a bottomed case 11 accommodating the capacitor element 10 and liquid component, a sealing member 12 sealing the opening of the bottomed case 11, a base plate 13 covering the sealing member 12, lead wires 14A and 14B drawn from the sealing member 12 and penetrating the base plate 13, and lead-tabs 15A and 15B connecting the lead wire and the electrodes of the capacitor element 10. The opening end of the bottomed case 11 is curled so as to crimp the sealing member 12.

The capacitor element 10 is made of a wound body as shown in FIG. 2. The wound body is a semi-manufactured product of the capacitor element 10, and refers to those not having the conductive polymer compound disposed between the anode body 21 having a dielectric layer on a surface and the cathode body 22. The wound body is made by winding the anode body 21 connected to the lead-tab 15A, and the cathode body 22 connected to the lead-tab 15B, with the separator 23 interposed therebetween. The outermost periphery of the wound body is fixed with a stop tape 24. FIG. 2 shows a part of the wound body in an exploded state before the outermost periphery thereof is stopped.

The anode body 21 has a surface roughened metal foil, and a dielectric layer is formed on the roughened surface. By attaching a conductive polymer compound to at least a portion of the dielectric layer surface, the capacitor element 10 is formed.

In the following, an example of a method for producing an electrolytic capacitor is described.

(Step of Preparing Anode Body 21 Having Dielectric Layer and Cathode Body 22)

For the materials of the anode body 21 and cathode body 22, a metal foil including a valve metal is used. The valve metal is, in the case of the anode body 21, subjected to etching and the like to roughen the metal foil surface, by which a plurality of projections and depressions are formed on the metal foil surface. Next, the dielectric layer is formed on the roughened metal foil surface by an anodizing treatment. As necessary, the cathode body 22 surface may be roughened.

(Step of Producing Wound Body)

The anode body 21 and the cathode body 22 are wound with the separator 23 interposed therebetween to form the wound body. At this time, the lead tabs 15A, 15B can be erected from the wound body as illustrated in FIG. 2 by performing the winding while rolling up lead tabs 15A, 15B. The stop tape 24 is disposed at the outer surface of the cathode body 22 positioned at the outermost layer of the wound body, to fix an end portion of the cathode body 22. When a large metal foil is cut to be used for the anode body 21, the wound body may be further anodized to form the dielectric layer at the cut portion of the anode body 21.

(Step of Forming Capacitor Element)

For example, the dielectric layer is immersed in a dispersion liquid of a conductive polymer compound, to form a film of a conductive polymer compound covering at least a portion of the dielectric layer. In this manner, the capacitor element 10 in which the conductive polymer compound is disposed between the anode body 21 and the cathode body 22 is produced. The step of adding the dispersion liquid of the conductive polymer compound to the dielectric layer surface may be repeated twice or more. Afterwards, the capacitor element 10 may be immersed in the liquid component. In this manner, the electrolytic capacitor including the conductive polymer compound and liquid component is produced. By immersing the capacitor element 10 in the liquid component, an electrolytic capacitor with excellent repair characteristics of the dielectric layer can be produced.

(Step of Sealing Capacitor Element)

For the material of the bottomed case 11, which accommodates the capacitor element 10 along with the liquid component so that the lead wires 14A, 14B are positioned at the opening side of the bottomed case 11, metals such as aluminum, stainless steel, copper, iron, brass, and the like, or an alloy including these is used. Next, the opening of the bottomed case 11 is sealed with the sealing member 12 to which the lead wires 14A, 14B pass through, and the opening end is crimped to the sealing member 12 to be curled, and a base plate 13 is disposed to the curled position to produce the electrolytic capacitor as shown in FIG. 1. Thereafter, an aging treatment may be performed while a rated voltage is being applied.

In the embodiment above, a wound type electrolytic capacitor is described, but application of the present invention is not limited to the range described above, and may be applied to other electrolytic capacitors, including, for example, a chip-type electrolytic capacitor using a sintered metal body as an anode body and a laminated-type electrolytic capacitor using a metal plate as an anode body.

EXAMPLES

Hereinafter, the present invention will be described in more detail based on examples, but the present invention is not limited to the examples.

Examples 1 to 14, Comparative Examples 1 to 11

A wound type electrolytic capacitor (diameter 10 mm×L (length) 10 mm) with a rated voltage of 25 V and a rated electrostatic capacitance of 330 μF was produced. In the following, a method for producing an electrolytic capacitor is described in detail.

(Preparation of Anode Body)

An aluminum foil with a thickness of 100 μm was subjected to etching to roughen the aluminum foil surface. Afterwards, the aluminum foil surface was anodized to form a dielectric layer. The anodization was performed by immersing the aluminum foil in an adipic acid ammonium solution, and applying a voltage of 45 V thereto. Afterwards, the aluminum foil was cut to prepare an anode body.

(Preparation of Cathode Body)

An aluminum foil with a thickness of 50 μm was subjected to etching to roughen the aluminum foil surface. Afterwards, the aluminum foil was cut to prepare a cathode body.

(Production of Wound Body)

An anode lead-tab and a cathode lead-tab were connected to the anode body and cathode body, and the anode body and cathode body were wound along with the lead-tab with a separator interposed therebetween. Next, an end portion of the outer surface of the wound body was fixed with a stop tape to produce a wound body. To an end of each of the lead-tab projected from the wound body, an anode lead wire and a cathode lead wire are connected, respectively. The produced wound body was subjected to anodization again to form a dielectric layer at an end portion of the cut anode body.

(Preparation of Polymer Dispersion)

3,4-ethylenedioxy thiophene, and polystyrene sulfonic acid (PSS, weight-average molecular weight 100000) which is a polymer dopant, are dissolved in an ion-exchange water to prepare a solution mixture. While stirring the solution mixture, sulfuric acid iron (III) (oxidizer) dissolved in an ion-exchange water was added to perform a polymerization reaction. After the reaction, the produced reaction solution was dialyzed to remove the unreacted monomer and excessive oxidizer, to produce a polymer dispersion including about 5 mass % of PSS doped polyethylenedioxythiophene (PEDOT/PSS).

(Formation of Conductive Polymer Layer)

The wound body was immersed in the polymer dispersion housed in a predetermined vessel in a decompressed atmosphere (40 kPa) for 5 minutes, and then, the wound body was picked up from the polymer dispersion. Next, the wound body that had been impregnated with the polymer dispersion was dried in a drying furnace at 150° C. for 20 minutes to form a conductive polymer layer covering at least a portion of the dielectric layer. A capacitor element was formed in this manner (Preparation of Liquid Component)

To a solvent including an organic solvent and water, an acid component, a base component, and an antioxidant were added and mixed, thereby preparing the liquid component shown in Table 1 and Table 2. The value of the water content relative to the liquid component as a whole is as shown in Table 1 and Table 2. Ethylene glycol (EG), glycerine (GLY), or γ-butyrolactone (GBL) was used for the organic solvent. The first acid component, or the first acid component and second acid component were used for the acid component. Borodisalicylic acid (BS) or phthalic acid (FS) was used for the first acid component. Boric acid was used for the second acid component. Ethyldimethyl amine was used for the base component. To the liquid component, 12 mass % of a salt formed from the above-described acid component and base component was added. The molar ratio of the first acid component/base component was 1.0. Pyrogallol was used for the antioxidant. In the liquid component, the antioxidant content relative to the liquid component as a whole was set to 6 mass %. In Comparative Examples 1 to 3, 6, 9, and 11, the liquid component did not contain the antioxidant. In Examples 9 to 13 and Comparative Examples 1, 3 to 4, and 6 to 7, the liquid component did not contain the second acid component.

(Assembly of Electrolytic Capacitor)

In the liquid component, the above-described wound body was immersed for 5 minutes in a decompressed atmosphere (40 kPa) to form a conductive polymer layer. The capacitor element impregnated with the liquid component was produced in this manner. The produced capacitor element was sealed, to complete the electrolytic capacitor as shown in FIG. 1. Then, an aging treatment was performed at 130° C. for 2 hours while a rated voltage was being applied.

The electrolytic capacitor of Examples 1 to 14 and the electrolytic capacitor of Comparative Examples 1 to 11 were evaluated as below.

[Evaluation: Measurement on ESR and Leak Current]

Under a 20° C. environment, using a 4-terminal measurement LCR meter, ESR(initial ESR(Z0)) of the electrolytic capacitor with a frequency of 100 kHz was measured. Under a 20° C. environment, the electrolytic capacitor was applied with a rated voltage, and a leak current (initial leak current L0) after 2 minutes passed was measured.

Then, under a 145° C. environment, the electrolytic capacitor was stored for 2000 hours. After the storage, in the same manner as described above, under a 20° C. environment, ESR(Z1) and leak current (L1) were measured.

The evaluation results are shown in Tables 1 and 2.

In the electrolytic capacitor of Examples 1 to 14, the ESR and leak current were small in both the initial period and after the storage, and the increase in the ESR at the time of storage and the leak current were suppressed. In Examples 1 to 8, in which boric acid was further included in the liquid component as the second acid component, the ESR after storage and leak current were further reduced.

In the electrolytic capacitor of Examples 5 to 7, the water content was high, 5 mass % or more and 10 mass % or less, and the decomposed acid generated more, but the ESR after storage and leak current were sufficiently reduced. As described above, by including the antioxidant and polyol compound in the liquid component, the effects of suppressing erosion of the anode body and cathode body by the decomposed acid were significantly achieved. With the electrolytic capacitor of Example 14 using GLY, the ESR after storage and leak current were small compared with the electrolytic capacitor of Example 3 using EG.

TABLE 1

| | Liquid component | | | | ESR(mΩ) | | Leak current(μA) | |
| --- | --- | --- | --- | --- | --- | --- | --- | --- |
| | Water content (mass %) | Organic solvent | First acid component | Second acid component | Anti-oxidant | Initial period | After storage at 145° C. for 2000 hours | Initial period | After storage at 145° C. for 2000 hours |
| Ex. 1 | 0.1 | EG | BS | Boric acid | Used | 12 | 13 | 3.4 | 8.2 |
| Ex. 2 | 1 | EG | BS | Boric acid | Used | 12 | 14 | 3.5 | 8.5 |
| Ex. 3 | 2 | EG | BS | Boric acid | Used | 11 | 13 | 3.3 | 9.2 |
| Ex. 4 | 3 | EG | BS | Boric acid | Used | 12 | 14 | 3.1 | 10.5 |
| Ex. 5 | 5 | EG | BS | Boric acid | Used | 11 | 17 | 3.4 | 13.5 |
| Ex. 6 | 7 | EG | BS | Boric acid | Used | 10 | 17 | 3.3 | 15.1 |
| Ex. 7 | 10 | EG | BS | Boric acid | Used | 11 | 19 | 3.2 | 23.7 |
| Ex. 8 | 15 | EG | BS | Boric acid | Used | 11 | 25 | 3.3 | 34.3 |
| Ex. 9 | 0.1 | EG | BS | — | Used | 12 | 16 | 3.6 | 8.4 |
| Ex. 10 | 1 | EG | BS | — | Used | 11 | 18 | 3.5 | 8.9 |
| Ex. 11 | 3 | EG | BS | — | Used | 12 | 19 | 3.2 | 16.1 |
| Ex. 12 | 10 | EG | BS | — | Used | 11 | 20 | 3.4 | 24.7 |
| Ex. 13 | 15 | EG | BS | — | Used | 12 | 26 | 3.4 | 35.1 |
| Ex. 14 | 2 | GLY | BS | Boric acid | Used | 9 | 11 | 3.5 | 6.7 |

TABLE 2

| | Liquid component | | | | | ESR(mΩ) | | Leak current(μA) | |
| --- | --- | --- | --- | --- | --- | --- | --- | --- | --- |
| | water content (mass %) | organic solvent | First acid component | Second acid component | Anti-oxidant | Initial period | After storage at 145° C. for 2000 hours | Initial period | After storage at 145° C. for 2000 hours |
| Comp. Ex.1 | 2 | EG | BS | — | None | 13 | 102 | 3.7 | 8.7 |
| Comp. Ex.2 | 2 | EG | BS | Boric acid | None | 12 | 97 | 3.5 | 7.7 |
| Comp. Ex.3 | 2 | EG | FS | — | None | 11 | 335 | 3.6 | 102.7 |
| Comp. Ex.4 | 2 | EG | FS | — | Used | 12 | 208 | 3.5 | 98.6 |
| Comp. Ex.5 | 2 | EG | FS | Boric acid | Used | 12 | 56 | 3.3 | 77.3 |
| Comp. Ex.6 | 2 | GBL | BS | — | None | 13 | 3340 | 3.6 | 234.8 |
| Comp. Ex.7 | 3 | GBL | BS | — | Used | 12 | 2386 | 3.1 | 178.2 |
| Comp. Ex.8 | 5 | GBL | BS | Boric acid | Used | 11 | 843 | 3.0 | 98.1 |
| Comp. Ex.9 | 7 | GBL | BS | Boric acid | None | 14 | 10503 | 3.8 | 5685.7 |
| Comp. Ex.10 | 7 | GBL | BS | Boric acid | Used | 12 | 8906 | 3.9 | 4556.3 |
| Comp. Ex.11 | 7 | EG | BS | Boric acid | None | 11 | 345 | 3.4 | 197.7 |

With the electrolytic capacitor of Comparative Examples 1 to 3, 6, 9, and 11, the liquid component did not include the antioxidant, and therefore the conductive polymer deteriorated during storage. With the electrolytic capacitor of Comparative Examples 1 to 3, 6, 9, and 11, the anode body and cathode body deteriorated by the decomposed acid. Thus, with the electrolytic capacitor of Comparative Examples 1 to 3, 6, 9, and 11, the ESR after storage increased.

With the electrolytic capacitor of Comparative Examples 6 to 10, GBL was used for the solvent, and esterification of the decomposed acid (salicylic acid) of BS did not progress, and therefore the anode body and cathode body deteriorated from decomposed acid, and the ESR after storage and leak current increased. With the electrolytic capacitor of Comparative Examples 3 to 5, BS was not used for the acid component, and therefore the acid component deteriorated from heat at the time of the electrolytic capacitor storage, and the ESR after storage and leak current increased.

INDUSTRIAL APPLICABILITY

The electrolytic capacitor of the present invention has a small ESR and leak current, and is therefore suitably applied for the usage which requires high reliability. Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10: capacitor element, 11: bottomed case, 12: sealing member, 13: base plate, 14A,14B: lead wire, 15A,15B: lead-tab, 21: anode body, 22: cathode body, 23: separator, 24: stop tape

The invention claimed is:

1. An electrolytic capacitor comprising: a capacitor element and a liquid component, wherein
the capacitor element includes an anode body having a dielectric layer on a surface thereof, and a conductive polymer compound covering at least a portion of the dielectric layer,
the liquid component includes an acid component, a base component, a solvent, and an antioxidant,
the solvent includes water and a polyol compound,
the acid component includes a coordination compound including a central atom, and an organic molecule having a plurality of coordination atoms bonded to the central atom, and
at least one of the plurality of coordination atoms is an oxygen atom bonded to a carbonyl group.

2. The electrolytic capacitor of claim 1, wherein the central atom is at least one selected from the group consisting of a boron atom, an aluminum atom, and a silicon atom.

3. The electrolytic capacitor of claim 1, wherein the coordination compound includes at least one selected from the group consisting of borodisalicylic acid, borodiglycollic acid, and borodioxalic acid.

4. The electrolytic capacitor of claim 1, wherein the antioxidant includes at least one selected from the group consisting of a phenol antioxidant, an amine antioxidant, a phosphorus antioxidant, a sulfur antioxidant, and an aliphatic antioxidant.

5. The electrolytic capacitor of claim 1, wherein in the liquid component, a molar ratio of the antioxidant relative to the organic molecule: antioxidant/organic molecule is 0.05 or more and 30 or less.

6. The electrolytic capacitor of claim 1, wherein the acid component includes an oxoacid other than the coordination compound.

7. The electrolytic capacitor of claim 6, wherein the oxoacid includes boric acid.

8. The electrolytic capacitor of claim 6, wherein the molar ratio of the oxoacid relative to the organic molecule: oxoacid/organic molecule is 0.05 or more and 30 or less.

9. The electrolytic capacitor of claim 1, wherein the polyol compound includes a glycerine compound.

10. The electrolytic capacitor of claim 1, wherein a water content relative to the liquid component as a whole is 0.1 mass % or more and 10 mass % or less.

11. The electrolytic capacitor of claim 1, wherein the water content relative to the liquid component as a whole is 5 mass % or more and 10 mass % or less.

* * * * *